US 12,278,470 B2

(12) United States Patent
Nguyen et al.

(10) Patent No.: US 12,278,470 B2
(45) Date of Patent: Apr. 15, 2025

(54) LINE FEEDTHROUGH

(71) Applicant: Hilti Aktiengesellschaft, Schaan (LI)

(72) Inventors: Huu Toan Nguyen, Eichberg (CH);
Christoph Hakenholt, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 100 days.

(21) Appl. No.: 17/754,839

(22) PCT Filed: Sep. 30, 2020

(86) PCT No.: PCT/EP2020/077333
§ 371 (c)(1),
(2) Date: Apr. 13, 2022

(87) PCT Pub. No.: WO2021/073871
PCT Pub. Date: Apr. 22, 2021

(65) Prior Publication Data
US 2024/0120722 A1    Apr. 11, 2024

(30) Foreign Application Priority Data
Oct. 15, 2019   (EP) .................................... 19203192

(51) Int. Cl.
  *F16L 15/04*    (2006.01)
  *F16L 5/10*    (2006.01)
  (Continued)

(52) U.S. Cl.
  CPC .................. *H02G 3/22* (2013.01); *F16L 5/10* (2013.01); *F16L 15/04* (2013.01)

(58) Field of Classification Search
  CPC ..... F16L 15/04; F16L 5/04; F16L 5/10; F16L 5/025; H02G 15/013; H02G 3/22; H02G 3/0412; H02G 3/0462
  (Continued)

(56) References Cited

U.S. PATENT DOCUMENTS

| 7,642,461 B2 | 1/2010 | Klein et al. |
| 9,383,043 B2 | 7/2016 | Klein et al. |

(Continued)

FOREIGN PATENT DOCUMENTS

| CN | 105090624 A | * 11/2015 | ................ F16L 5/02 |
| DE | 36366663 | 11/1987 | |

(Continued)

OTHER PUBLICATIONS

International Search Report issued Dec. 9, 2020 in PCT/EP2020/077333, with English translation, 7 pages.

(Continued)

*Primary Examiner* — Timothy J Thompson
*Assistant Examiner* — Guillermo J Egoavil
(74) *Attorney, Agent, or Firm* — Grüneberg and Myers PLLC

(57) ABSTRACT

A line feedthrough for guiding at least one line through a component, contains a cladding tube, a fastening element, and at least one sealing element which is in the form of a flexible hose body and arranged within the cladding tube. The hose body is connected, in a first axial end region, to the fastening element. It is possible to displace said hose body between a closed position, in which the hose body at least partially closes a passage through the hose body, and an open position, in which a passage through the hose body is at least partially unblocked. A spring device is provided that acts on the fastening element, which can be displaced in the longitudinal direction (L) relative to the cladding tube, with a force that presses the hose body toward a closed position.

19 Claims, 4 Drawing Sheets

(51) Int. Cl.
*H02G 3/04* (2006.01)
*H02G 3/22* (2006.01)

(58) Field of Classification Search
USPC .......................................... 174/668; 277/606
See application file for complete search history.

(56) References Cited

U.S. PATENT DOCUMENTS

| | | |
|---|---|---|
| 2008/0128998 A1 | 6/2008 | Klein et al. |
| 2010/0025983 A1* | 2/2010 | Rosch .................... F16L 37/40 |
| | | 285/148.19 |
| 2011/0094759 A1 | 4/2011 | Lopes |
| 2012/0217424 A1 | 8/2012 | Klein et al. |
| 2015/0107776 A1* | 4/2015 | Schubert ................. H02G 1/16 |
| | | 156/433 |
| 2022/0316625 A1* | 10/2022 | Kondrus .................. H02G 3/22 |
| 2022/0364660 A1* | 11/2022 | Nguyen ................. F16L 5/025 |

FOREIGN PATENT DOCUMENTS

| | | | |
|---|---|---|---|
| DE | 102006035475 | 6/2008 | |
| DE | 102010063652 | 6/2012 | |
| DE | 202012101987 U1 * | 10/2013 | ............ F16L 29/007 |
| WO | WO-2021058791 A1 * | 4/2021 | ................ F16L 5/08 |

OTHER PUBLICATIONS

Written Opinion issued Dec. 9, 2020 in PCT/EP2020/077333, with English translation, 10 pages.

* cited by examiner

LINE FEEDTHROUGH

CROSS-REFERENCE TO RELATED APPLICATIONS

This application is the National Stage entry under § 371 of International Application No. PCT/EP2020/077333, filed on Sep. 30, 2020, and which claims the benefit of priority to European Application No. 19203192.0, filed on Oct. 15, 2019. The content of each of these applications is hereby incorporated by reference in its entirety.

BACKGROUND OF THE INVENTION

Field of the Invention

The invention relates to a line feedthrough for guiding at least one line through a component, comprising a cladding tube, a fastening element and at least one sealing element which is in the form of a flexible hose body and arranged within the cladding tube, according to the type described in greater detail further below.

Description of Related Art

Line feedthroughs of this kind are used to guide lines such as pipelines, cables or cable ducts through components such as ceilings or walls, and are built into a component such as a wall or ceiling when or after said component is created. In particular, the line feedthroughs can be cast in concrete ceilings or walls or feedthroughs can later be drilled, sawn or cut into the component. Line feedthroughs of this kind are preferably provided with a fire protection function. Fire protection is therefore already in place, from the time of installation or casting into the component to the installation of the line through the line feedthrough through to the completion of the building. An important factor in line feedthroughs of this kind is their internal tightness against gaseous media such as flue gas.

DE 10 2006 035 475 A1 discloses a line feedthrough which can be introduced into a component such as a concrete wall. The line feedthrough comprises a cladding tube consisting of two parts, and a hose body that can be rotated along its longitudinal axis, at the first and second axial hose ends of which body a first and a second ring part, respectively, are arranged, which ring parts act as support elements for the hose body. The two axial hose ends of the hose body can be rotated relative to one another by a total of at least 45°, preferably at least 90°, such that a passage through the hose body can be closed or an inner diameter of the hose body can be reduced substantially to zero.

This line feedthrough is disadvantageous in that, for example as a result of a user error after a line has been guided through, the hose body is not closed or is not sufficiently closed, and if this is not detected, it may not be possible to reliably prevent gas from passing through the line feedthrough.

SUMMARY OF THE INVENTION

The problem addressed by the present invention is therefore that of providing a line feedthrough for guiding lines through components, by means of which line feedthrough a passage through the hose body can be securely closed.

Therefore, a line feedthrough for guiding at least one line through a component is proposed, the line feedthrough comprising a cladding tube, a fastening element and at least one sealing element which is in the form of a flexible hose body and arranged within the cladding tube, the hose body being connected, in a first axial end region, to the fastening element and it being possible to displace said hose body between a closed position, in which the hose body at least partially closes a passage through the hose body or an inner diameter of the hose body is at least partially closed, and an open position, in which the passage or the inner diameter of the hose body is at least partially unblocked.

According to the invention, it is proposed that a spring device is provided which acts on the fastening element, which can be displaced in the axial direction relative to the cladding tube, with a force which presses the hose body toward its closed position.

By means of the solution according to the invention, it can be ensured in a structurally simple manner that the hose body assumes its closed position in a basic state regardless of the number and size of lines guided through the hose body, in which closed position the passage is in particular completely closed. Gas is reliably prevented from passing through the line feedthrough regardless of the number and size of the lines that are guided through the line feedthrough and arranged within the hose body. After being actuated by a user, the hose body is reliably transferred into the closed position as a result of the provision of the spring device, and therefore user errors can be reliably prevented.

The cladding tube can, for example, have a circular, elliptical, square, rectangular, triangular, polygonal or similar cross section.

DETAILED DESCRIPTION OF THE INVENTION

Figure 1:
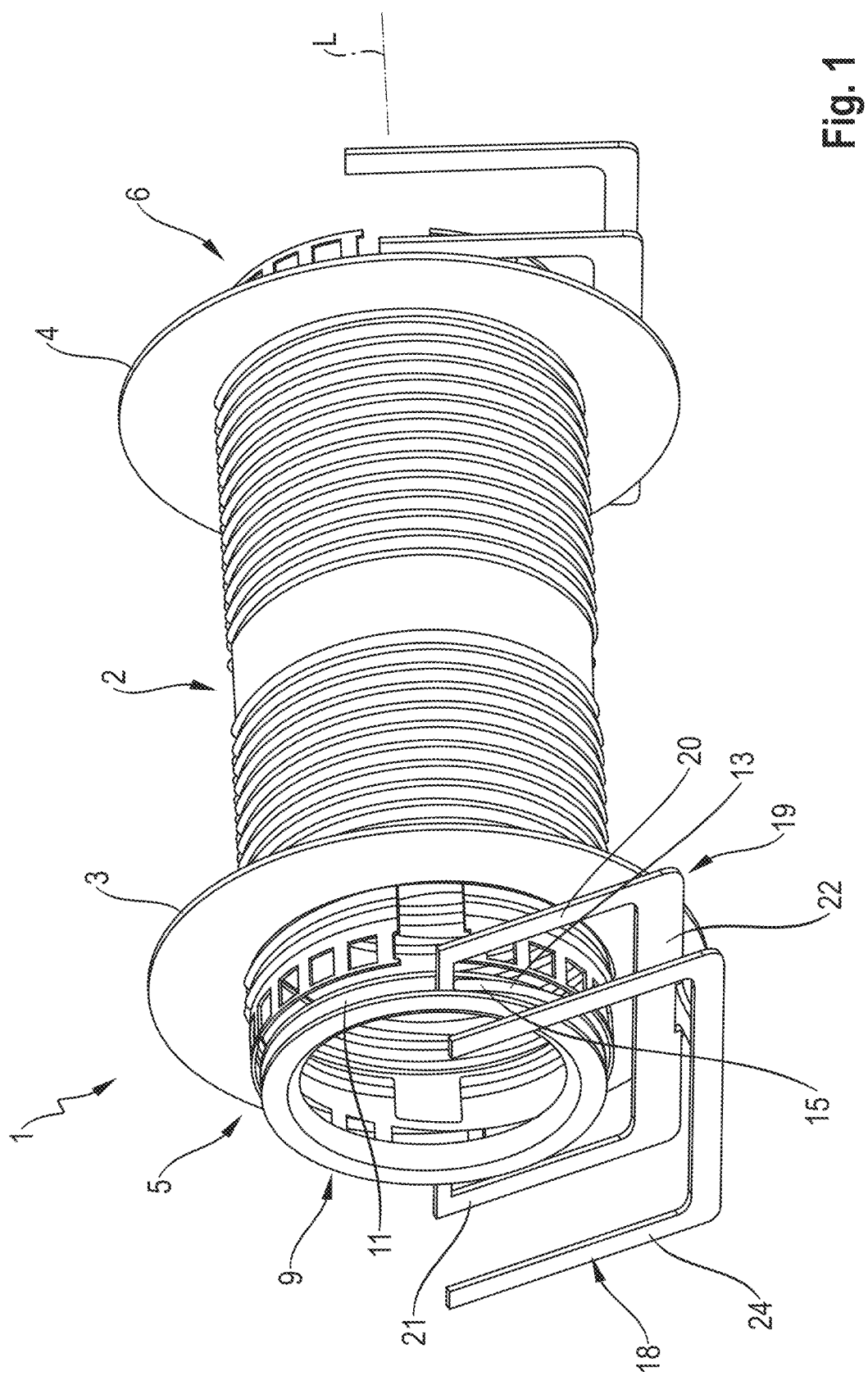
FIG. 1 shows a three-dimensional view of a line feedthrough comprising a cladding tube and a fastening element which can be actuated by a lever.

In an advantageous embodiment of the line feedthrough, the hose body can be rotated along its longitudinal axis, the spring device being designed as a torsion spring and the torsion spring converting an axial displacement of the fastening element into a rotation of the hose body. As a result, the hose body can be displaced between its closed position and its open position, in which the hose body at least partially unblocks the passage through the hose body in order to guide through lines. The hose body is in this case in particular mounted so as to be rotatable about its longitudinal axis. The torsion spring preferably interacts with the in particular annular fastening element and with the cladding tube. As a result of its elasticity, the inner diameter of the hose body can be varied by rotating the hose body. In its closed position, the hose body sealingly abuts a line that is guided through. The contact between the line and the hose body extends axially over a certain length, whereby a high degree of tightness is achieved. In its open position, the hose body preferably has a large opening cross section such that lines can be easily guided through the hose body without damaging the hose body.

In a structurally simple embodiment of the line feedthrough, the spring device can also be designed as a tension spring, which preferably interacts with the in particular annular fastening element and with the cladding tube.

In order to be able to particularly reliably transfer the hose body into its closed position, a device can be provided in a preferably central region of the hose body in the longitudinal direction of the hose body, which device preloads the hose body toward its closed position. In particular, the preferably resilient device completely surrounds the hose body and transfers it into its closed position in the unloaded state. However, the hose body can be transferred into its open position, counter to a force acting on the hose body from the device, by means of the application of an external force.

In a structurally simple embodiment of the invention, the device is in the form of a spring device, an elastic band, a rubber band or the like.

Alternatively or in addition thereto, two sealing members can be provided which are mounted so as to be movable in the longitudinal direction relative to one another, a first sealing member which is at least partially tubular and a second sealing member which is at least partially tubular, each having, in mutually facing end regions, a plurality of circumferentially distributed, strip-shaped, in particular lamellar elements, mutually facing end regions of the strip-shaped elements being displaced inward transversely to the longitudinal direction at least in regions when the sealing members are displaced in the longitudinal direction toward one another, due to the interaction of the strip-shaped elements of the first sealing member with the strip-shaped elements of the second sealing member. In this way, a particularly effective seal can be achieved, since, even if there are a plurality of cables, lines, pipes or the like guided through the line feedthrough, the strip-shaped elements which are in particular completely circumferentially distributed enable the hose body to rest securely on the elements guided through even when the guided elements together do not have a circular cross section and, for example, there are stark cross-sectional changes in the circumferential direction, such as cable gaps.

In particular when the strip-shaped elements are designed as lamellae, it is possible to easily ensure that, as a result of the interaction of the lamellae of the two sealing members of the hose body in all circumferential regions, the hose body is pressed tightly against the elements guided through the line feedthrough, such as cables, lines, pipes or the like, and a good seal is achieved.

The sealing members and/or the strip-shaped elements comprise in particular a plastics material or a metal, and can in particular be an injection molded part or a bent sheet metal part.

The sealing members are connected, in remote end regions, in particular to the relevant fastening element such that a displacement of the fastening elements relative to one another leads to a displacement of the sealing members relative to one another.

In order to easily guarantee that the strip-shaped elements ensure a secure seal in the closed position, mutually facing ends of the strip-shaped elements can be bent at least slightly inward in the radial direction in the unloaded state in the radial direction.

In the embodiment comprising the two sealing members, the tube body can be present as a result of an exclusively axial displacement of the sealing members and the tube body during a transfer between the open position and the closed position. Alternatively thereto, end regions of the hose body can be rotated relative to one another in order to transfer between the open position and the closed position.

The sealing members preferably completely circumferentially encompass the hose body.

In order to be able to monitor the state of the line feedthrough in a simple manner, a sensor device can be provided by means of which in particular the closed position and/or the open position of the hose body can be determined. By means of the sensor device, it is possible to reliably determine the state of the hose body, even without visual verification, by means of using appropriate, in particular wireless means.

In an advantageous embodiment, the sensor device is designed as a contact sensor, in particular as an RFID sensor, or as a contactless sensor, it being possible, in principle, to use a wide variety of sensors.

In a simple embodiment of the invention, the fastening element is designed as an annular element which preferably completely circumferentially encompasses the hose body in the axial end region. The annular element can comprise an annular channel which, for example, opens outwardly and is provided, for example, in order to interact with the spring device.

In one advantageous embodiment of the line feedthrough according to the invention, a displacement device is provided by means of which the fastening element can be displaced in the axial direction or in the longitudinal direction of the line feedthrough and the hose body can be displaced toward its open position. In this way, a displacement of the hose body that can be carried out easily by a user can also be implemented, counter to the spring force of the spring device, from the closed position into the open position.

In order to advantageously transmit to the fastening element a force introduced by the user, the displacement device can have a lever element which interacts in the axial direction with the fastening element in a fixed manner and is designed to interact with the cladding tube, in particular with a stop rigidly connected to the cladding tube. The lever element can, for example, be substantially U-shaped and, for example, engage by means of end regions of the U-legs in the outwardly open annular channel of the annular element.

In order to simplify handling of the displacement device, the displacement device can comprise a grip element which can be actuated by a user and which is in particular rigidly connected to the lever element.

In an advantageous embodiment of the line feedthrough, the hose body is connected to a further fastening element in a second end region remote from the first axial end region, a further spring device (e.g. second spring device 16) being provided which acts on the further fastening element, which can be displaced in the axial direction relative to the cladding tube, with a force which presses the hose body toward its closed position, a further displacement device being provided by means of which the fastening element can be displaced in the axial direction and the hose body can be displaced toward its open position. The hose body and the cladding tube can in this case be designed such that the second end region is comparable to the first end region, it being possible for the further fastening element, the further spring device and the further displacement device to be substantially comparable to the fastening element, the spring device and the displacement device. As a result of this design, the hose body, when mounted, can be transferred from both sides into the open position, and lines can be guided through the line feedthrough. This is particularly advantageous when the line feedthrough is mounted in a wall.

The hose body is preferably very thin and preferably has a material thickness of from 0.01 to 2 mm. The hose body can have a narrow portion in its central region. This limits the maximum possible opening cross section such that, when the line feedthrough is not occupied by a line, the open cross section in the open state is not undesirably large.

The hose body is preferably made of a gas-tight material, such as a woven fabric, rubber, film material or the like, which is simultaneously resilient.

In an advantageous embodiment of the line feedthrough, a resilient material such as a foam or rubber material is arranged on the inside of the hose body. In so doing, the tightness between a line guided through the hose body and the hose body can be further improved.

In an advantageous embodiment of a line feedthrough according to the invention, a sealing means is provided. The sealing means can, for example, be designed as a ring made of intumescent material, and ensures the fire protection of the line feedthrough. The sealing means can be arranged, for example, in the region of the fastening element or in the center of the cladding tube.

Further advantages can be found in the following description of the drawings. Embodiments of the present invention are shown in the drawings. The drawings and the description contain numerous features in combination. A person skilled in the art will expediently also consider the features individually and combine them to form meaningful further combinations.

In the drawings, identical and equivalent components are provided with the same reference signs.

Figure 2:
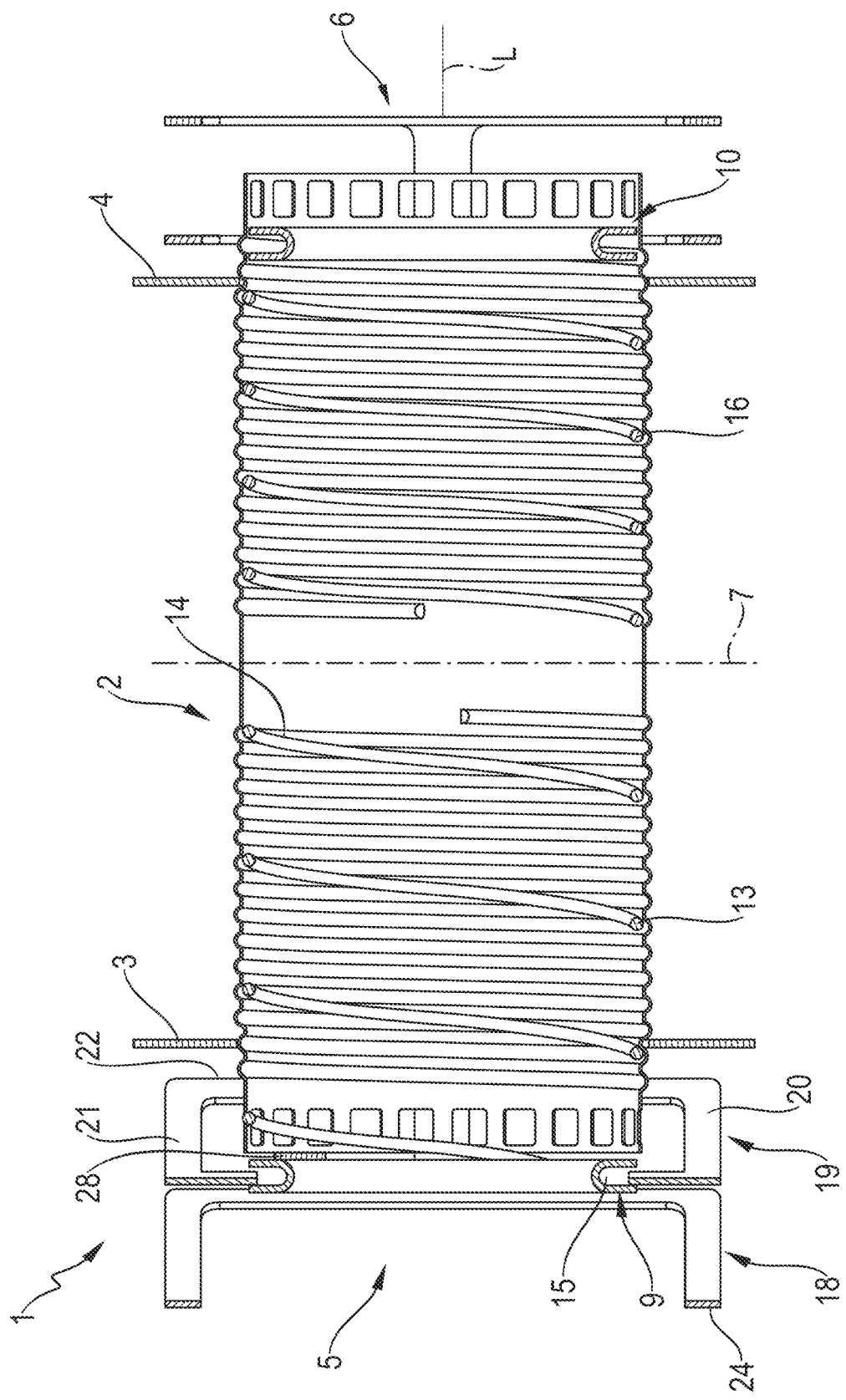
FIG. 2 shows a longitudinal sectional view of the line feedthrough according to FIG. 1.
Figure 3:
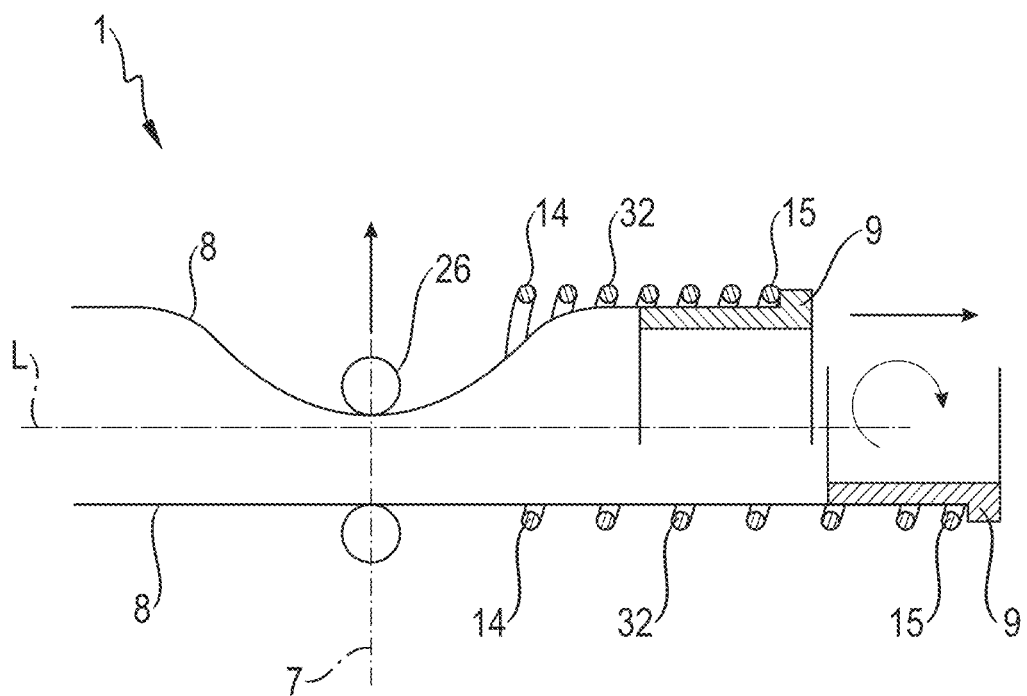
FIG. 3 shows a greatly simplified schematic diagram of an alternatively designed line feedthrough.
Figure 4:
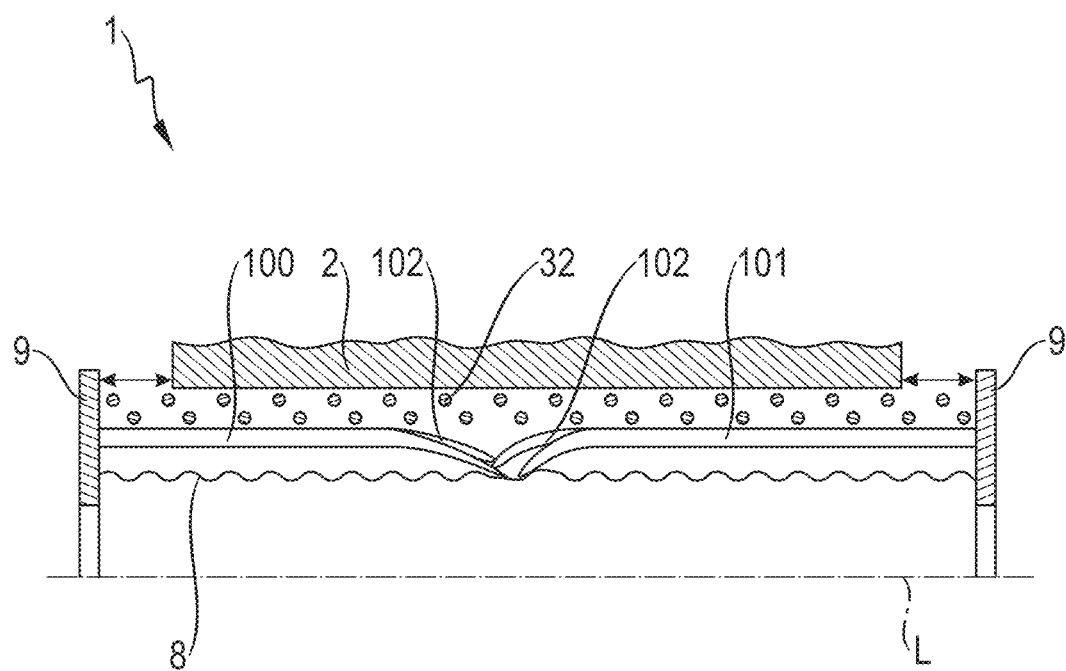
FIG. 4 shows a further greatly simplified schematic diagram of a further alternatively designed line feedthrough.

In the drawings:

FIG. 1 is a three-dimensional view of a line feedthrough comprising a cladding tube and a fastening element which can be actuated by a lever, wherein a hose body that is connected to the fastening element and arranged in the cladding tube is not shown;

FIG. 2 is a longitudinal sectional view of the line feedthrough according to FIG. 1;

FIG. 3 is a greatly simplified schematic diagram of an alternatively designed line feedthrough; and FIG. 4 is a further greatly simplified schematic diagram of a further alternatively designed line feedthrough.

FIG. 1 and FIG. 2 show a first embodiment of a line feedthrough 1 comprising a dimensionally stable cladding tube 2 which has two annular bodies 3, 4 provided in order to interact with a component, for example a concrete wall. The line feedthrough 1 can be subsequently introduced into an opening in the component or it can be incorporated into the component when said component is created. The annular bodies 3, 4, which represent assembly elements, are provided for securing the line feedthrough 1 against tensile and shear forces and form assembly flanges which preferably have recesses for guiding through fastening elements, such as screws or nails, in order to fix the annular body 3, 4 to the component.

In the present case, the line feedthrough 1 is substantially symmetrical with respect to a central transverse plane 7 which is arranged perpendicular to a longitudinal axis L of the line feedthrough 1, with two end regions 5, 6 being substantially comparable to one another. The first end region 5 is described in the following as being representative of the second end region 6.

The line feedthrough 1 also has a sealing element 8 (shown in greater detail in FIG. 3, for example) which extends along its longitudinal axis L and which is designed in this case as a flexible hose body that can be rotated about the longitudinal axis L as the axis of rotation or as a hose element. Similar to that shown in FIG. 3, the hose element 8 is connected in each of its end regions to a fastening element 9 or 10, which is designed in this case as an annular element comprising an outwardly open channel 11.

The hose element 8 in this case consists, for example, of a flexible and/or resilient, thin-walled and gas-tight rubber, woven fabric or film material and is provided on the inside with a resilient material such as a foam or rubber material. In this case, thin-walled is understood to mean that the wall thickness of the material in the present case is approximately 0.01 mm to approximately 2 mm. The resilient material can be arranged on the inside of the hose element 8, for example in the form of a continuous coating, or only in regions, for example in the form of strips or ribs arranged in the longitudinal direction of the hose element 8. The hose element 8 can have a narrow portion which, when the hose element is installed in the cladding tube 2 of the line feedthrough 1, has an inner diameter that is smaller than a maximum diameter of the hose element 8, in particular in the region of the connection to the annular elements 9. The inner diameter of the hose element 8 describes an average opening width of the hose element 8, such that hose elements having an oval or a polygonal cross section, i.e. a non-circular cross section, also have an inner diameter according to this definition. The two axial hose ends of the hose element 8 or the hose body can in the present case be rotated relative to one another by a total of at least 45°, preferably at least 90°, such that the inner diameter of the hose element 8 can be reduced to zero.

The end regions of the hose element 8 are preferably connected, around the entire circumference thereof, to the annular elements 9, 10, the annular elements 9, 10 in the present case circumferentially surrounding the end regions of the hose element 8. A spring device 13, in this case in the form of a torsion spring, is arranged within the cladding tube 2 and is non-rotatably connected to the cladding tube 2 by a first end region 14 near the central transverse plane 7. By means of an end region 15 remote from the central transverse plane 7, the torsion spring 13 is arranged in the channel 11 of the fastening element 9, which channel in this case has a U-shaped cross section, and is rigidly connected to the fastening element 9. A second spring device 16, in this case in the form of a torsion spring, is arranged within the cladding tube 2 and is non-rotatably connected to the cladding tube 2 by a first end region near the central transverse plane 7. By means of an end region remote from the central transverse plane 7, the second spring device 16 is arranged in channel of the second fastening element 10, which channel in this case has a U-shaped cross section, and is rigidly connected to the second fastening element 10.

The fastening element 9 can be displaced in the longitudinal direction L relative to the cladding tube 2 and is arranged so as to be able to rotate relative to the cladding tube 2. A displacement of the fastening element 9 in the longitudinal direction L thus leads, by means of the torsion spring 13, to a rotation of the fastening element 9 about the longitudinal direction L. As a result, the hose element 8 is also rotated about the longitudinal direction L by means of the connection to the fastening element 9. The design is selected such that, in a first end position of the fastening element 9, in which said fastening element is displaced to a maximum toward the central transverse plane 7, the hose element 8 assumes a closed position in which a passage within the hose element 8 is completely closed both when one or more lines are guided through the hose element 8 and when there are no lines or cables guided through, and the passage of gas is reliably prevented as a result.

When the fastening element 9 is displaced in a direction away from the central transverse plane 7 toward a second end position of the fastening element 9, the hose element 8 is rotated or derotated, counter to a spring force of the torsion spring 13, toward an open position as a result of the rotation of the fastening element 9 caused by the torsion spring 13, whereby a through-opening through the hose element 8 is unblocked in particular for the arrangement of lines or cables.

In order to be able to easily displace the fastening element 9 in the longitudinal direction L from the first end position toward the second end position, in the present case a displacement device 18 is provided which comprises a lever element 19. In the present case, the lever element 19 is U-shaped and engages in each case by means of legs 20, 21 in the channel 11 of the fastening element 9. A leg 22 of the lever element 19 that connects the legs 20, 21 is designed to interact with the cladding tube 2, in this case with the annular body 3 which forms a stop for the lever element 19. The displacement device 18 also comprises a grip element 24 which is rigidly connected to the lever element 19 and by means of which the displacement device 18 can be operated in a user-friendly manner.

When the user displaces a region of the grip element 24 near the longitudinal axis L, the leg 22 is supported on the annular body 3 and the legs 20, 21 displace the fastening element 9 relative to the cladding tube 2 in a direction away from the central transverse plane 7. As described in greater detail above, this causes the hose element 8 to be transferred from the closed position toward the open position. Without an external application of force to the grip element 24, the fastening element 9 is transferred back toward its first end position in the longitudinal direction L due to the energy stored in the torsion spring 13, the hose element 8 thereby being transferred into its closed position.

In order to be able to particularly reliably ensure, in the closed position, that the passage through the hose element 8 is preferably completely closed, a preferably resilient device 26 can, for example, completely circumferentially encompass the hose element 8 in a region preferably near the central transverse plane 7 or in the region of the central transverse plane 7, with the device 26 acting on the hose body 8 with a force that presses the hose body 8 into its closed position. The device 26 can, for example, be in the form of a spring device, elastic band or rubber band.

In order to be able to determine the state of the line feedthrough 1, i.e. whether the hose element 8 is in the closed position, and in particular to also be able to determine this from a location remote from the line feedthrough 1, a sensor device 28 (shown here only schematically) can be provided. The sensor device 28 is designed in this case as a contact sensor in the form of an RFID sensor, with signals from the sensor device 28 being transmitted by wire or preferably wirelessly to an external device, such as a mobile phone or a server, so that the state of the line feedthrough 1 can be monitored therefrom.

The line feedthrough 1 can also comprise a sealing means (not shown in greater detail here) which can be connected, for example, to the cladding tube 2 or the fastening element 9. The sealing means is, for example, a ring made of an intumescent material, and ensures the fire protection of the line feedthrough 1.

As a result of the symmetrical design of the line feedthrough 1, the hose element 8 can advantageously be transferred, from both end regions 5, 6, from the closed position into the open position and vice versa. This is particularly advantageous when the line feedthrough 1 is in a mounted state.

FIG. 3 is a greatly simplified alternative schematic diagram of a line feedthrough 1, a spring device which preloads the hose element 8 toward the closed position being designed in this case as a tension spring 32. The tension spring 32 is rigidly connected at one end to the fastening element 9 and rigidly connected at the other end to the cladding tube 2. Moreover, in this embodiment, the device 26 which applies a force to the hose element 8 toward the closed position is provided in a central region.

Starting from the closed position of the hose element 8 in the upper part of FIG. 3, the fastening element 9 can be displaced, similarly to the above embodiments, by means of the displacement device 18 into the open position shown in the lower part of FIG. 3, the fastening element 9 thereby being displaced in the axial direction in a direction away from the central transverse plane 7 counter to the force applied by the device 26. As a result of the provision of the tension spring 32, the hose element 8 is in this case not rotated about the longitudinal axis L, for example. Without applying an external force to the fastening element 9, the fastening element 9 is displaced back toward its first end position by the tension spring 32, the device 26 ensuring that a passage through the hose element 8 is thereby securely closed.

FIG. 4 is a greatly simplified further alternative schematic diagram of a line feedthrough 1, with only the differences from the preceding embodiments being discussed and otherwise reference being made to the comments with regard to the embodiments described in greater detail above.

A spring device which preloads the hose element 8 toward the closed position is designed in this case as a spiral tension spring 32, the two ends of the spiral tension spring 32 being connected to the relevant fastening element 9. The fastening elements 9 each comprise a generally tubular sealing member 100 or 101 that is rigidly connected to the fastening element 9, the sealing members 100, 101 being arranged in the radial direction between the hose element 8 and the spiral tension spring 32 or the cladding tube 2.

In regions facing one another, the sealing members 100, 101 each have circumferentially distributed, strip-shaped elements in the form of lamellae 102, which are bent or kinked inward in the radial direction in mutually facing end areas in the unloaded state.

FIG. 4 shows the open position in greater detail, in which the fastening elements 9 are at a maximum distance from one another in the longitudinal direction L, for example. If, for example, the fastening elements 9 are moved toward one another by the spiral tension spring 32 without the application of force via the displacement device 18, the lamellae 102 of the sealing members 100, 101 move inward in a radial direction due to the interaction of the lamellae 102 of the first sealing device 100 with the lamellae 102 of the second sealing device 101. In this case, the lamellae 102 press the hose element 8, in a manner distributed over the entire circumference, inward in the radial direction in particular sealingly into contact with cables, lines or the like appropriately guided through the line feedthrough 1, so that a good seal is achieved.

The spiral tension spring 32 is designed so as to act on the fastening elements 9 with a tensile force directed toward one another both in the open position and in the closed position.

The invention claimed is:

1. A line feedthrough for guiding at least one line through a component, comprising:
   a cladding tube,
   a fastening element,
   a spring device, and
   at least one sealing element which is in the form of a flexible hose body and arranged within the cladding tube,
   wherein the hose body is connected, in a first axial end region, to the fastening element and wherein the hose body is configured to be displaced between a closed position, in which the hose body at least partially closes a passage through the hose body, and an open position, in which a passage through the hose body is at least partially unblocked, and
   wherein the spring device acts on the fastening element, which is configured to be displaced in an axial direction relative to the cladding tube, with a force that presses the hose body toward the closed position.

2. The line feedthrough according to claim 1, wherein the hose body is configured to be rotated along its longitudinal axis (L), and wherein the spring device is designed as a torsion spring and the torsion spring converts an axial displacement of the fastening element into a rotation of the hose body.

3. The line feedthrough according to claim 1, wherein the spring device is designed as a tension spring.

4. The line feedthrough according to claim 1, wherein the line feedthrough further comprises a preloading device which preloads the hose body toward the closed position.

5. The line feedthrough according to claim 4, wherein the preloading device is in the form of a spring device, elastic band or rubber band.

6. The line feedthrough according to claim 1, wherein the line feedthrough further comprises two sealing members, which are mounted so as to be movable in the longitudinal direction (L) relative to one another,
   wherein the two sealing members comprises a first sealing member, which is at least partially tubular, and a second sealing member, which is at least partially tubular, each having, in mutually facing end regions, a plurality of circumferentially distributed, strip-shaped elements,
   wherein mutually facing end regions of the strip-shaped elements are displaced inward transversely to the longitudinal direction (L), at least in regions when the sealing members are displaced in the longitudinal direction (L) toward one another, due to interaction of the strip-shaped elements of the first sealing member with the strip-shaped elements of the second sealing member.

7. The line feedthrough according to claim 1, wherein the line feedthrough comprises a sensor device which is configured to determine at least the closed position of the hose body.

8. The line feedthrough according to claim 7, wherein the sensor device is designed as a contact sensor or as a contactless sensor.

9. The line feedthrough according to claim 1, wherein the fastening element is designed as an annular element.

10. The line feedthrough according to claim 9, wherein the line feedthrough further comprises a displacement device which is configured to displace the fastening element in a longitudinal direction (L).

11. The line feedthrough according to claim 10, wherein the displacement device has a lever element which interacts in the longitudinal direction (L) with the annular element in a fixed manner and is designed to interact with the cladding tube.

12. The line feedthrough according to claim 10, wherein the displacement device comprises a grip element.

13. The line feedthrough according to claim 1, wherein the hose body is further connected to a second fastening element in a second end region remote from the first axial end region,
   wherein the line feedthrough further comprises a second spring device which acts on the second fastening element, which is configured to be displaced in a longitudinal direction (L) relative to the cladding tube, with a force which presses the hose body toward the closed position, and
   wherein the line feedthrough comprises a displacement device which is configured to displace the second fastening element in the longitudinal direction (L) and is configured to displace the hose body toward the open position.

14. The line feedthrough according to claim 1, wherein the hose body is made of a gas-tight material.

15. The line feedthrough according to claim 1, wherein a resilient material is arranged on the inside of the hose body.

16. The line feedthrough according to claim 1, wherein the line feedthrough further comprises a sealing means.

17. The line feedthrough according to claim 6, wherein the strip-shaped elements are lamellar elements.

18. The line feedthrough according to claim 8, wherein the sensor device is an RFID sensor.

19. The line feedthrough according to claim 11, wherein the lever element is designed to interact with a stop rigidly connected to the cladding tube.

* * * * *